3,660,449
REACTION PRODUCTS OF SILICON MONOXIDE AND ACETYLENES AND METHODS OF PREPARING THE SAME
Erich T. Schaschel, Toledo, Ohio, assignor to Owens-Illinois, Inc.
No Drawing. Filed Mar. 3, 1970, Ser. No. 16,238
Int. Cl. C07f 7/08, 7/18
U.S. Cl. 260—448.2 D          18 Claims

ABSTRACT OF THE DISCLOSURE

An organo silicon polymer is prepared by the reaction of silicon monoxide and an organic compound containing a triple bond such as acetylene to provide a polymer that is useful as a lubricant, as a coating composition ingredient and as a filler for plastic compositions.

---

The present invention relates to reaction products of silicon monoxide and an organic compound containing a triple bond such as acetylene and methods for preparing the same.

It is an object of the present invention to provide a new reaction product by reacting gaseous silicon monoxide, in a chamber under vacuum with the organic compound on a cooled surface of the chamber to provide the reaction thereupon.

It is an object of the present invention to provide a reaction product of silicon monoxide and acetylene and methods of preparing the same.

These and other objects will be apparent from the specification that follows and the appended claims.

The present invention provides a reaction product of silicon monoxide and an organic compound that is preferably acetylene generally in a one-step reaction to provide a new organo silicon polymer.

The present invention also provides methods of making an addition product of silicon monoxide and acetylene or other unsaturated organic compounds having a triple bond by heating solid silicon monoxide under vacuum generally between $1\times10^{-6}$ to $1\times10^{-2}$ torr, preferably between 1 to $5\times10^{-5}$ torr to about 1200° to 1300° C. to provide gaseous silicon monoxide, and reacting the gaseous silicon monoxide with an excess of acetylene on a rotatable cylindrical surface which is cooled with liquid nitrogen. The addition reaction of silicon monoxide with the acetylene apparently takes place on the cool surface at a temperature of about −196° to 100° C. A large excess molar amount of acetylene promotes the addition reaction rather than the polymerization of SiO itself. In general, the polymeric co-condensate is a solid infusible material that is either insoluble in (organic) solvents or soluble in solvents such as benzene, acetone, dioxane, dimethyl formamide, etc. It is hygroscopic mainly due to a high surface area and shows good high-temperature-resistance properties. Thus, in general, products are solid and infusible (they decompose slowly and gradually at higher temperatures of about greater than 400° to 450° C.).

In accordance with the present invention, spectroscopic and hydrolytic decomposition data of the silicon monoxide acetylene co-condensate indicate that successful addition of silicon monoxide to the triple and then the double bond has occurred in accordance with the following equation:

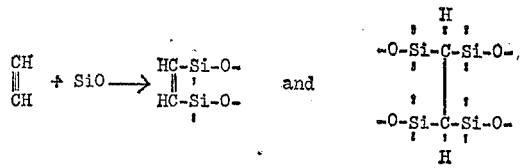

Apparently the polymerization of silicon monoxide itself completes somewhat with the addition reaction. While not wishing to be bound by theory, it is believed that the transfer from mono-coordinated silicon in the monomeric silicon monoxide to tetra-coordinated silicon in the reaction product is responsible for the highly cross-linked structure. The resultant polymer can contain Si—Si bridges in addition to Si—O—Si bridges.

Silicon monoxide can be obtained commercially and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pats. Nos. 2,882,177 and 2,823,979 which are incorporated by reference.

The silicon monoxide used in the present invention is preferably in the gaseous form, the reaction taking place with the acetylene at a temperature generally of about −196° to 100° C. and preferably about −196° to −70° C. is generally about a fraction of a second.

The organic compound containing the triple bond generally is used in excess of the silicon monoxide. Generally the molar ratio of organic compound to silicon monoxide is in the range of about 1.5:1 to 100:1 and preferably about 5:1 to 60:1. The optimum molar ratio is usually about 10:1 to 50:1.

Although acetylene is highly preferred as the organic compound having a triple bond for use in the present invention, other organic compounds having a triple bond are suitable such as allylene (methyl acetylene), ethyl acetylene, crotonylene (dimethyl acetylene), t-butyl acetylene, 1-pentyne (α-valerylene), 2-pentyne, and 3-methyl-1-butyne, 1-hexyne, 2-hexyne, 1-heptyne and other acetylenes having having the general formula R—C≡C—R where R is the same or different alkyl radical preferably having from 1 to 12 carbon atoms or aromatic radical such as phenyl, benzyl, or naphthyl preferably containing from 6 to 12 carbon atoms, including 1-decyne, 1-dodecyne, diphenylacetylene and dibenzylacetylene. In the formula, R also can include other reactive groups such as halides, —COOR, —COOH, —OH, —OR, etc. While there may be, in some cases, competing reaction due to these groups, there is a reaction between the sublimed silicon monoxide and the triple bond of the organic compound in accordance with this invention.

The following examples are intended to illustrate the present invention and are not intended to limit the same in any way.

EXAMPLE 1

Acetylene was reacted with silicon monoxide at a pressure of about 1 to $5\times10^{-5}$ torr by co-condensing both gases onto a rotatable cylinder—which served as a quenching trap. The reaction of silicon monoxide with acetylene apparently took place on the cool surface of the cylinder. The silicon monoxide was prepared by heating commercially available SiO (as, for instance, sold by Union Carbide Corporation) to about 1200–1300° C. at the high vacuum indicated and quenching the same with a large excess of the organic reactant. The ratio of silicon monoxide to the organic reactant (acetylene) was about 1:50. Upon warming to room temperature, the excess of unreacted acetylene was pumped off and removed from the reaction product which was a light brown solid. This solid was pyrophoric as well as being insoluble in organic solvents and infusible. The yield based on the amount of silicon monoxide condensed onto the cold surface is about 100%. The products were used as fillers in organic compositions such as organopolysiloxane compositions, polyvinyl chloride compounds, as stock-cock greases and in high temperature laminates with glass fibers and other high temperature fibrous materials including mats and webs.

EXAMPLE 2

Diphenyl acetylene was reacted with silicon monoxide in the ratio of about 10 moles of diphenyl acetylene to 1 mole of silicon monoxide as described in Example 1. The solid material recovered from the quenching trap on the cooled surface of the rotatable cylinder was extracted with n-pentane to remove the excess of the unreacted diphenyl acetylene. The resultant reaction product dissolved partially in benzene and partially in dimethyl formamide leaving behind only a small amount of insoluble residue. From the benzene solution, hexaphenylbenzene (22% of the total reaction product) and a low molecular weight organopolysiloxane (22% of the total reaction product) with a 1:1 addition ratio of silicon monoxide to diphenyl acetylene were isolated. The dimethyl formamide solution yielded an organopolysiloxane (51% of the total reaction product) with an addition ratio of silicon monoxide to diphenyl acetylene between about 1:1 and about 2:1.

In the above examples, other organic compounds having triple bonds were substituted for the acetylene and diphenyl acetylene starting materials. Substantially equivalent results were obtained. The resultant polymers were infusible and mostly insoluble in organic solvents. The soluble polymers are useful as coating solutions to coat glass and plastics, wood and other materials. They are also usable for self-supporting films and sheets. The insoluble products are useful as stop-cock greases and as fillers in plastic compositions such as organopolysiloxane molding compositions.

What is claimed is:

1. A reaction product of one mole of silicon monoxide and about 1.5 to 100 moles of a hydrocarbon compound having a triple bond, the silicon monoxide and hydrocarbon compound being mixed at a pressure of about $1 \times 10^{-6}$ to $1 \times 10^{-2}$ torr to form a mixture that is condensed at about $-196°$ to $100°$ C. to provide the reaction product.

2. An organo silicon polymer having a molecular chain with (—Si—O—) units prepared by the reaction of one mole of silicon monoxide and about 5 to 60 moles of a hydrocarbon compound having a triple bond, the silicon monoxide and hydrocarbon compound being mixed at a pressure of about $1 \times 10^{-6}$ to $1 \times 10^{-2}$ torr to form a mixture that is condensed at about $-196°$ to $100°$ C. to provide the polymer.

3. A method of preparing an organo silicon polymer comprising reacting about one mole of silicon monoxide with about 1.5 to 150 moles of a hydrocarbon compound having a triple bond, the silicon monoxide and hydrocarbon compound being mixed at a pressure of about $1 \times 10^{-6}$ to $1 \times 10^{-2}$ torr to form a mixture that is condensed at about $-196°$ to $100°$ C. to provide the reaction product.

4. A method of preparing an organo silicon polymer comprising the steps of heating solid silicon monoxide to about $1200°$ to $1300°$ C. in a vacuum to form gaseous silicon monoxide, and reacting one mole of the gaseous silicon monoxide with about 5 to 60 moles of a hydrocarbon compound having a triple bond at a pressure of about $1 \times 10^{-5}$ to $5 \times 10^{-5}$ torr to form a mixture, and condensing the mixture at about $-196°$ to $-70°$ C. to provide the organo silicon polymer.

5. A reaction product of one mole of silicon monoxide and about 1.5 to 100 moles of acetylene.

6. A reaction product as defined in claim 1 in which the hydrocarbon compound is diphenyl acetylene.

7. A method as defined in claim 3 in which the hydrocarbon compound is acetylene.

8. A method as defined in claim 3 in which the hydrocarbon compound is phenyl acetylene.

9. A method of making an organo silicon polymer by:
(1) mixing one mole of gaseous silicon monoxide in a vacuum at a pressure of about $1 \times 10^{-6}$ to $1 \times 10^{-2}$ torr with about 1.5 moles to 100 moles of a hydrocarbon compound having a triple bond and having the general formula: R—C≡C—R where R is hydrogen, an alkyl radical of 1 to 12 carbon atoms or an aromatic radical of 6 to 12 carbon atoms to form a mixture, and
(2) condensing the mixture at about $-196°$ C. to $100°$ C. to obtain the organo silicon polymer.

10. A method as defined in claim 9 in which the molar ratio of hydrocarbon compound to silicon monoxide is about 5:1 to 60:1.

11. A method as defined in claim 9 in which the hydrocarbon compound is acetylene and the molar ratio of acetylene to silicon monoxide is about 50:1.

12. A method as defined in claim 10 in which the mixing of the silicon monoxide and hydrocarbon compound is at a pressure of about $1 \times 10^{-5}$ to $5 \times 10^{-5}$ torr.

13. A method as defined in claim 10 in which the condensing is at a temperature of about $-196°$ to $-70°$ C.

14. A method as defined in claim 9 in which the hydrocarbon compound is diphenyl acetylene and 10 moles of diphenyl acetylene is used per 1 mole of silicon monoxide.

15. A method of making an organo silicon polymer comprising the steps of:
(1) mixing in a vacuum of about $1 \times 10^{-6}$ torr to $1 \times 10^{-2}$ torr about one mole of gaseous silicon monoxide with about 5 to 60 moles of a gaseous hydrocarbon compound having a triple bond to form a gaseous mixture, and
(2) solidifying the mixture at a temperature of about $-196°$ C. to $-70°$ C. to form the organo silicon polymer.

16. A method as defined in claim 15 in which the hydrocarbon compound is acetylene.

17. A reaction product as defined in claim 1 having a molecular chain with (—Si—O—) units and (—Si—Si—)

units.

18. A method as defined in claim 9 in which the hydrocarbon compound has the general formula R—C≡C—R where R is hydrogen or an alkyl radical of 1 to 12 carbon atoms.

No references cited.

TOBIAS E. LEVOW, Primary Examiner

P. F. SHAVER, Assistant Examiner

U.S. Cl. X.R.

117—124 F, 147; 252—49.6; 260—375 B, 46.5 R, 448.2 E, 448.2 Q, 448.2 R, 448.8 R